US012575695B2

(12) United States Patent
    Ovaska

(10) Patent No.: US 12,575,695 B2
(45) Date of Patent: Mar. 17, 2026

(54) COOKERY METHOD AND COOKERY DEVICE FOR OUTDOORS CONDITIONS

(71) Applicant: Ritnifjell Innovations Oy, Rovaniemi (FI)

(72) Inventor: Jaakko Ovaska, Rovaniemi (FI)

(73) Assignee: RITNIFJELL INNOVATIONS OY, Rovaniemi (FI)

( * ) Notice: Subject to any disclaimer, the term of this patent is extended or adjusted under 35 U.S.C. 154(b) by 353 days.

(21) Appl. No.: 18/255,042

(22) PCT Filed: Dec. 7, 2021

(86) PCT No.: PCT/FI2021/050847
    § 371 (c)(1),
    (2) Date: May 30, 2023

(87) PCT Pub. No.: WO2022/123114
    PCT Pub. Date: Jun. 16, 2022

(65) Prior Publication Data
    US 2024/0000260 A1       Jan. 4, 2024

(30) Foreign Application Priority Data
    Dec. 8, 2020    (FI) ...................................... 20206265

(51) Int. Cl.
    *A47J 36/26*          (2006.01)
    *A47J 37/07*          (2006.01)
(52) U.S. Cl.
    CPC ........... *A47J 36/26* (2013.01); *A47J 37/0713* (2013.01); *A47J 37/0763* (2013.01)
(58) Field of Classification Search
    CPC ..... A47J 36/26; A47J 37/0713; A47J 37/0763
    (Continued)

(56) References Cited

U.S. PATENT DOCUMENTS

| 6,012,382 A | 1/2000 | Mclemore |
| 6,050,257 A | 4/2000 | Bond |
(Continued)

FOREIGN PATENT DOCUMENTS

| CN | 203533645 U | 4/2014 |
| FR | 2234880 A1 | 1/1975 |
(Continued)

OTHER PUBLICATIONS

Anonymous, Tehdaan trangiasta kaasugrilli !. [online], https://www. youtube.com/watch?v=_ ZRZsoaniyA, Jul. 15, 2020, Saatavilla Internet-osoitteesta.

(Continued)

*Primary Examiner* — Vivek K Shirsat
(74) *Attorney, Agent, or Firm* — NIXON & VANDERHYE

(57) ABSTRACT

Disclosed is a grill converter of a camping stove for outdoors conditions, the camping stove including at least two pots. The grill converter includes a flame distribution plate to receive and spread a point-like flame. A frying base is placed over the flame distribution plate for grilling food. A bracket is used for attaching the flame distribution plate and the frying base at a desired distance to form a uniformly movable grill converter for converting cooking function of the camping stove to grilling function by distributing the point-like flame through the flame distribution plate to the frying base for grilling food. The flame distribution plate has dimensions of +/−40 mm with respect to a diameter of a smallest pot bottom of a camping stove structure.

10 Claims, 5 Drawing Sheets

Figure 1:
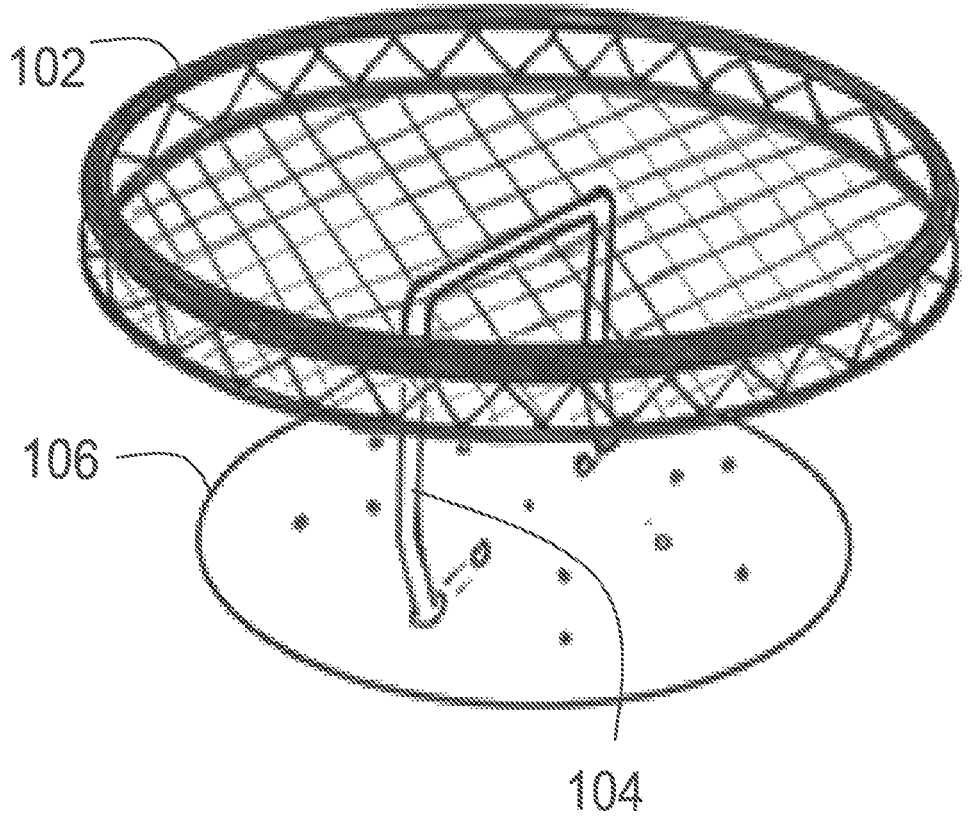

(58) Field of Classification Search
  USPC ........................ 126/1 R, 25 R, 9 R, 9 A, 9 B
  See application file for complete search history.

(56)                References Cited

U.S. PATENT DOCUMENTS

| | | | | |
|---|---|---|---|---|
| 11,206,947 B1 * | 12/2021 | Barnhart | ............. | A47J 37/0786 |
| 2014/0311356 A1 | 10/2014 | Daniels | | |

FOREIGN PATENT DOCUMENTS

| | | | |
|---|---|---|---|
| WO | 9420005 A1 | 9/1994 |
| WO | 0117409 A1 | 3/2001 |
| WO | 2010075307 A2 | 7/2010 |

OTHER PUBLICATIONS

International Search Report for PCT/FI2021/050847 mailed Apr. 22, 2022, 4 pages.
Written Opinion of the ISA for PCT/FI2021/050847 mailed Apr. 22, 2022, 6 pages.
International Preliminary Report on Patentability for PCT/FI2021/050847 completed Feb. 1, 2023, 21 pages.
Finland Search Report for FI20206265 dated Jul. 5, 2021, 2 pages.

* cited by examiner

102

106

104

106

104

COOKERY METHOD AND COOKERY DEVICE FOR OUTDOORS CONDITIONS

CROSS-REFERENCE TO RELATED APPLICATIONS

This application is the US national stage of PCT application PCT/FI2021/050847 filed on Dec. 7, 2021, which in turn claims the priority of FI application 20206265, filed Dec. 8, 2020, the entirety of both being incorporated herein by reference.

FIELD OF THE INVENTION

The invention relates to cooking in outdoor conditions, in which, for example, a gas burner, an alcohol burner or a gasoline burner is used for cooking or heating food.

BACKGROUND OF THE INVENTION

The preparation of camping food in outdoor and off-road conditions is limited by forest fire warning times, when food must not be prepared or grilled over an open fire. Careless use of open fires or unauthorized campfires, especially during wildfire warning periods, has sometimes resulted in devastating wildfires and major economic losses.

The use of a camping stove is permitted and safe even during a forest fire warning. Aluminum-framed camping stoves from various manufacturers have been on sale for decades. The main purpose of camping stoves is to cook on hikes and outdoor trips such as fishing, hunting, boating and picnics. Cookers are used to prepare food, for example, by cooking in a saucepan or frying in a frying base.

In recent years, gas burners have become more common in camping stoves instead of previous fuel burners, such as single burners. In the past, the gas burner has not been used in camping stoves for grilling purposes. According to the prior art, the gas burner of the camping stove heats the object above it with a point-shaped flame hit, whereby cooking requires either a saucepan or a frying base.

Other prior art burners, such as an alcohol burner and a gasoline burner, also have similar operating problems as the gas burner.

Gas-powered camping grills have been developed for camping use, which are not suitable for hiking use or to be carried on long distances. These camping grills are intended for barbecue use only and cannot be connected to camping stoves. There are also charcoal grills on the market, some of which are designed for camping use. The difficulty with these grills is the transport of the charcoal needed for grilling along the hike. In addition, there are disposable charcoal grills that are non-ecological due to their disposability. Charcoal grills also pose a fire safety risk, especially during wildfire warning times, due to hot coals at the end of grilling, as it is difficult to extinguish the coals.

Prior art document U.S. Pat. No. 6,050,257A presents a disassemblable grill, which comprises a radiant heating sheet comprised of a thin piece of corrugated sheet metal. In order to grill or barbecue, the unit as shown in the figures is placed directly on a portable open flame burner, preferably so that the corrugated sheet metal rests directly on the burner.

Prior art document D2 CN 203 533 645 U presents a traditional cookery device for outdoor conditions.

Prior art document FR 2 234 880 A1 presents a traditional cookery device for outdoor conditions.

Prior art document US 2014/311356 A1 presents an outdoor cooking grill capable of being reconfigured for a wide range of cooking techniques, using unique and common cooking surfaces including grills, griddles, woks, sauté pans, cast iron pans, Dutch ovens, baking stones, smoke racks, sloped griddles, split grills, heat spreader/sear plates, tall pots, turkey fryer pots, stock pots, lobster pots, and the like.

BRIEF DESCRIPTION OF THE INVENTION

The object of the invention is to diversify the possibilities of using a camping stove according to the prior art, so that it can also be used as a grill even in windy conditions and even during a forest fire warning period.

This is achieved with a grill converter of a camping stove for outdoors conditions, the camping stove comprising at least two pots. The grill converter comprises a flame distribution plate to receive and spread a point-like flame, a frying base placed over the flame distribution plate for grilling food and a bracket for attaching the flame distribution plate and the frying base at a desired distance to form a uniformly movable grill converter for converting cooking function of the camping stove to grilling function by distributing the point-like flame through the flame distribution plate to the frying base for grilling food, and the flame distribution plate having dimensions of +/−40 mm with respect to a diameter of a smallest pot bottom of a camping stove structure.

The invention also relates to a grill converting method of a cookery device for outdoors conditions. In the grill converting method is converted cooking function of the camping stove to grilling function by placing a frying base over the flame distribution plate for grilling food and is attached the flame distribution plate and the frying base at a desired distance by using a bracket to form a uniformly movable grill converter as a structure for grilling and is distributed a point-like flame through the flame distribution plate to the frying base for grilling food and the flame distribution plate is dimensioned with a diameter of +/−40 mm with respect to a diameter of a smallest pan bottom of a camping stove structure.

The invention is based on a grill converter which can be connected to a camping stove structure using a flame distribution plate for receiving and directing a gas flame or other flame to a frying base which is placed over the flame distribution plate by using a bracket to form a uniformly movable grill converter for grilling food.

The advantage of the invention is that the cookery device according to the invention is safe to grill even during wildfire warning times. It can also be used in areas where making an open fire is otherwise prohibited, difficult or impossible. Such areas include, for example, unwooded mountain uplands, islands and islets, other unwooded areas and protected areas.

LIST OF FIGURES

FIG. 1 presents a cookery device according to the invention for outdoor conditions.

Figure 2:
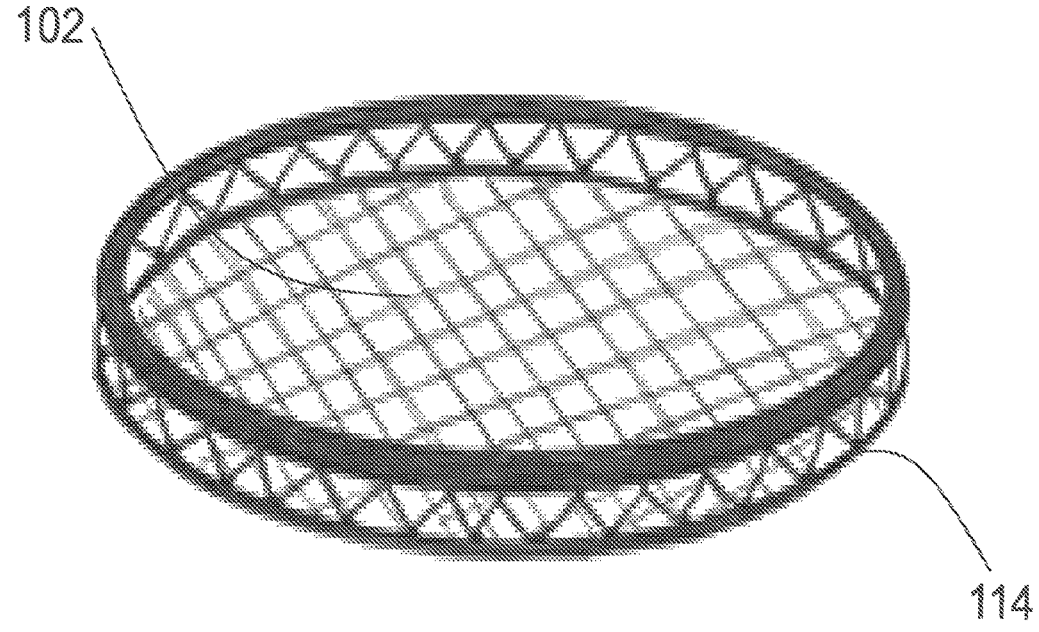

FIG. 2 presents a frying grate of a grill converter.

Figure 3:
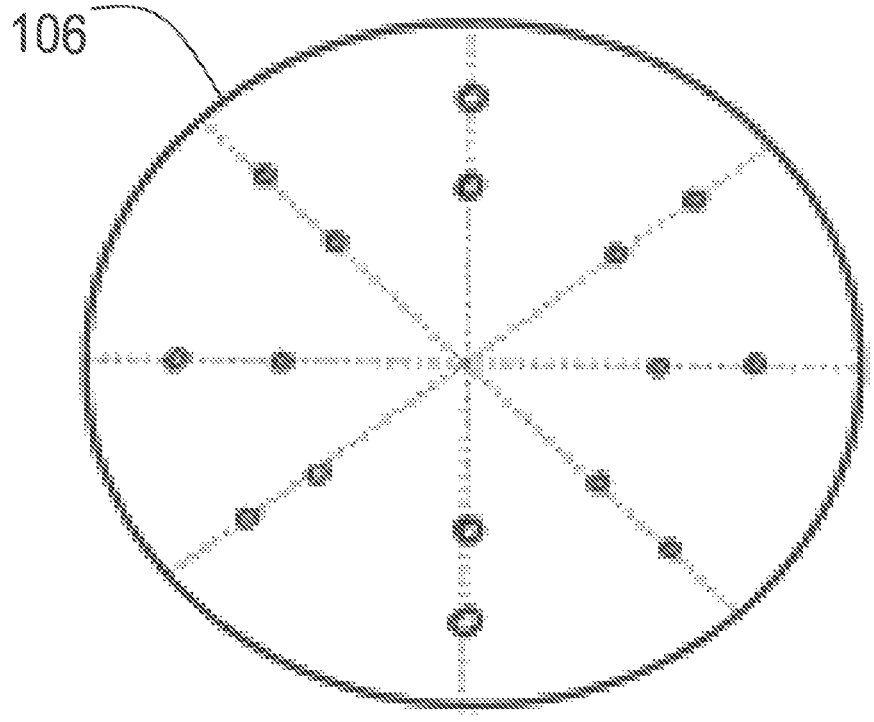

FIG. 3 presents the flame distribution plate of the grill converter.

Figure 4:
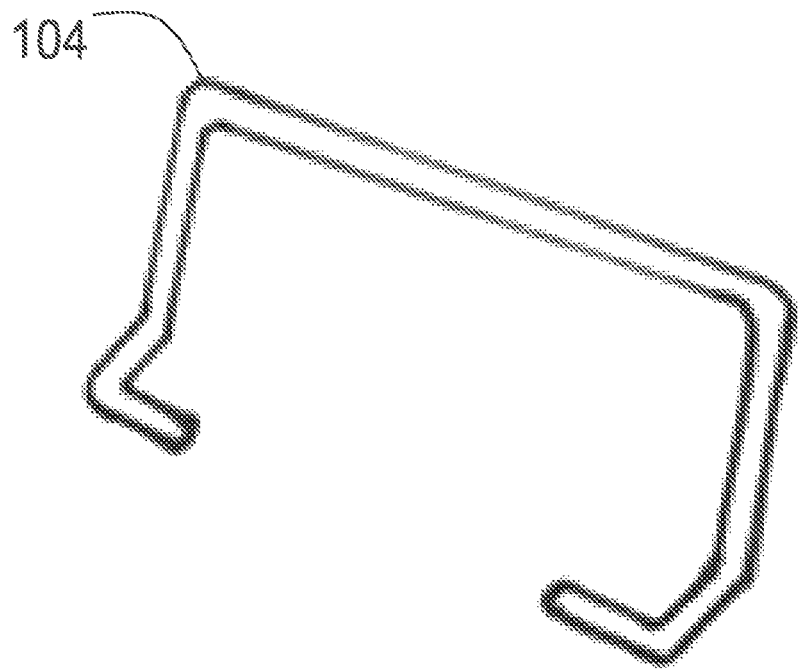

FIG. 4 presents the bracket.

Figure 5:
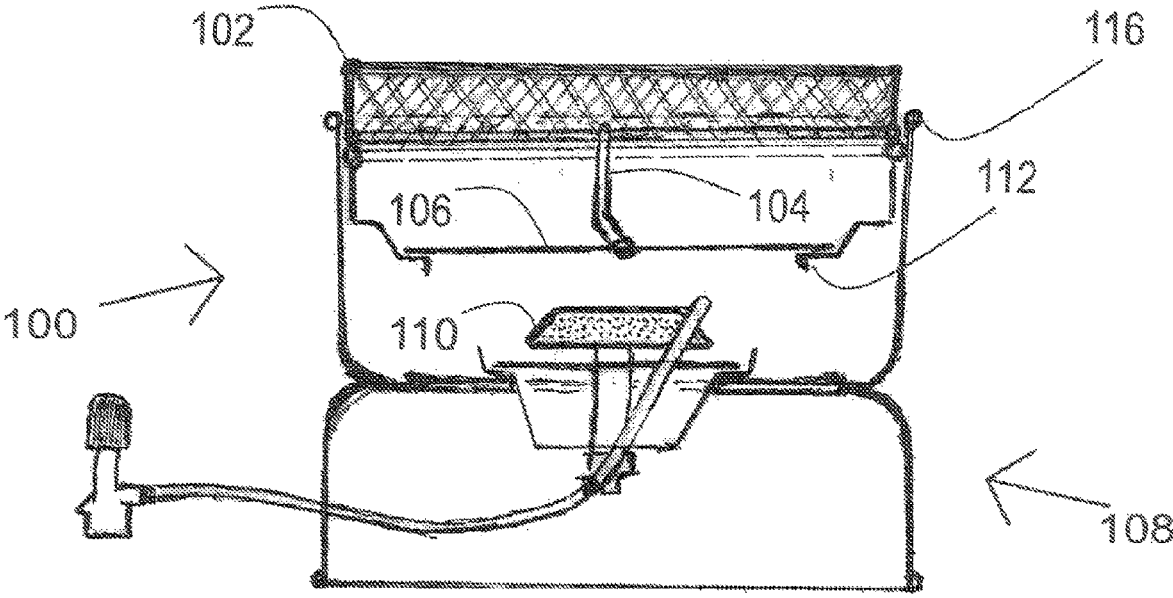

FIG. 5 presents an exemplary grill converter according to the invention integrated in a camping stove.

DETAILED DESCRIPTION OF THE INVENTION

The cookery device according to the invention is practical, ecological, and can be integrated with, for example, camping stoves with aluminum frames on the market, and it is capable of both cooking and grilling in hiking and camping conditions.

In one embodiment of the invention, the cookery device is formed, for example, in a camping stove equipped with a gas burner by integrating a grill converter therein, which converts the camping stove into a grill, if necessary. The camping stove is preferably made of aluminum. The burner can also be, for example, an alcohol burner or a gasoline burner.

For example, the grill converter installed in the camping stove evenly distributes the heat energy released from the gas burner to the available cooking area of the stove, so that grilling is successful.

The cookery device for outdoor conditions according to the invention presented in FIG. 1 comprises of a grill converter 100 comprising: a frying base 102, a bracket 104 and a flame distribution plate 106. The most important parts of the grill converter are the flame distribution plate and the frying base, without which the camping stove is not suitable for grilling. The function of the bracket 104 (i.e. the saucepan wire bracket 104) in the embodiments according to the invention is to attach the frying base and the flame distribution plate, which facilitates the use of the grill converter and makes it an easily movable unit.

The size of the grill converter parts is determined by the dimensions of each camping stove model. For example, the frying base for the Trangia series is 145 mm in diameter in the smaller Trangia 27-3UL and 185 mm in the larger Trangia 25-4UL. The flame distribution plate is 120 mm in diameter in the smaller Trangia series and 162 mm in diameter in the larger Trangia series.

The frying base 102 may be flat at the edges or bent up, or side pieces may be attached to the frying base as edge parts. In one embodiment of the invention, an iron wire-like rim substantially the same size as the perimeter of the frying base, said rim being supported e.g. on the saucepan brackets of the camping stove, can rotate round the perimeter of the frying base or under the frying base, whereby the frying base settles more firmly in the camping stove structure.

FIG. 2 presents one exemplary frying base 102 comprised of the grill converter 100. The frying base 102 is preferably grate-shaped frying grate. The frying base may preferably be bent at its edges at an angle of, for example, 75°-105° to a length of, for example, 3-60 mm. This is important for the usability of the grill converter. In addition, a metal rim can be rotated at the top and bottom of the frying base as a reinforcement, so that the frying base stays firmly in place during grilling and when packed. The bent edges make it easier to insert and remove the frying base 102. In addition, the bent edges are preferred for packaging the grill converter 100 inside a set of camping stove, for example. When packaged, the grill converter can be placed upside down on the saucepans in the cookery set and the frying base in the cookery set can be placed on the grill converter. Packed upside down inside the camping stove, the grill converter stays in place as part of the cookery set. In an exemplary embodiment of the invention, the frying base 102 of the grill converter 100 may be supported on at the hinge points of the saucepan brackets in the inner body of the camping stove. Thus, in use, the frying base 102 of the grill converter 100 can be placed on the saucepan brackets 104 in the wind shield of the camping stove, and the flame distribution plate 106 can be placed on the saucepan brackets 104 in the wind shield of the camping stove, respectively.

The material of the frying base is steel or other material suitable for grilling and may contain a coating to reduce the stickiness of the food.

FIG. 3 presents a flame distribution plate 106 of the grill converter 100, which is preferably circular in shape, for example having thickness of 0.3-2 mm, preferably 0.5 to 1.0 mm in steel or sheet metal or other hard heat-resistant metal. The dimensions of the flame distribution plate 106 are, for example, +/−40 mm with respect to the diameter 112 of the smallest saucepan bottom included in the camping stove structure 108. The flame distribution plate preferably has 16 holes arranged, for example, on four symmetrically spaced diameters. In one embodiment of the invention, the holes of the flame distribution plate on three diameters are ∅3 mm and on one diameter 5 mm. These holes are arranged symmetrically for the four diameters so that each diameter has four holes. The first hole with a diameter is 20 mm from the edge of the flame distribution plate towards the center and the second hole is 40 mm from the edge towards the center. This is advantageous due to the even distribution of heat. There are no holes in the middle of the flame distribution plate at the gas burner or other burner, so that the flame distribution plate protects the gas burner from any dirt that may fall from the frying base. With holes of the ∅5 mm diameter, the part between the holes may be forced 2 mm up from the surface of the flame distribution plate into a curved "tunnel". A bracket 104 of the flame distribution plate can be threaded to the part forced up from the open side. The flame distribution plate can be set at a distance of 5-60 mm from the burner.

When in use, the flame distribution plate 106 according to the invention rests on, for example, the brackets for the smallest saucepan in the saucepan set of the camping stove. Packed inside the camping stove, the flame distribution plate of the grill converter rests e.g. on top against the frying base under cover of the camping stove.

FIG. 2 presents a bracket 104 for a grill converter 100 according to one embodiment of the invention, which bracket is a rectangle bent from a ∅2-3 mm strong stretched metal shaft, and the other long side of said rectangle is ⅔ (two thirds) open in length. On the open side, the bracket is connected to the ∅5 mm holes in the flame distribution plate. The longest continuous side of the bracket 104 is, for example, 50-190 mm long. The bracket can be used to form a uniformly movable and operable assembly of the frying base 102 and the flame distribution plate 106. At its simplest, the bracket 104 may be a heat-resistant wire-like portion that connects the flame distributor plate and the frying base. In the embodiments according to the invention, the function of the bracket can also be realized in another way or without a separate bracket part, such as by hinge attachments to the edge structures of the camping stove. When using a bracket or other embodiment, the desired distance between the frying base 102 and the flame distribution plate 106 is preferably set to 10 mm to 80 mm.

In one embodiment of the invention, the short sides of the bracket 104 are 35-55 mm long. The bracket 104 of the grill converter 100 connects the frying base and the flame distribution plate to form a uniformly movable and operable grill converter. The short sides of the bracket are bent, for example, 15 mm above the joint of the flame distribution plate at an angle of about 25° coaxially so that the bracket rests against the surface of the frying base when the converter is packed on top of the saucepans of the camping stove.

The shapes, numbers and sizes, strength numbers and other numerical values of the holes shown in the flame distribution plate according to the invention are exemplary values and shapes related to one or more embodiments of the invention. The invention can also be implemented with other types of holes, numbers, strength numbers and other embodiments which fulfill the essential function of the flame distribution plate according to the invention, which is to spread a point-shaped flame over a wider area of the point-shaped shape. The flame distribution plate thus distributes the flame and the heat energy released from the burner evenly over the entire baking area.

With the cookery device according to the invention, it is safe to grill even during wildfire warning times. The grill converter can also be used in areas where making an open fire is otherwise prohibited, difficult or impossible. Such areas include, for example, unwooded mountain highlands, islands and islets, other unwooded areas and protected areas.

According to the invention, the cookery device implements a grill converter 100 which converts a camping stove into a grill. The grill converter is a practical, ecological accessory that can be integrated into camping stoves on the market, for example with an aluminum frame, which allows you to grill in hiking and camping conditions with a camping stove having a gas burner. The grill converter is packed when transported inside the camping stove, which makes it easy to transport the stove entity with hikes and trips. In this case, no separate utensils, camping stove, camping grill or the use of an open fire for cooking, frying or grilling are required. In addition, the cookery device according to the invention utilizes the thermal energy released from the gas burner very energy-efficiently, whereby the consumption of gas during grilling remains low. Depending on the cookery set, the grill converter weighs about 100-300 g, for example, so it only adds a little weight to the cooking appliance. The grill converter integrated in the camping stove according to the invention makes grilling safe even during a wildfire warning. In addition, the grill converter 100 allows food to be grilled in areas where making an open fire is otherwise impossible or challenging, such as mountain highlands, islands and islets, and other unwooded areas.

The invention claimed is:

1. A grill converter of a camping stove for outdoors conditions, the camping stove comprising at least two pots, the at least two pots including a first pot with a bottom having a first diameter and a second pot with a bottom having a second diameter, the second diameter being larger than the first diameter, wherein the grill converter comprises a flame distribution plate to receive and spread a point-like flame, a frying base placed over the flame distribution plate for grilling food on the frying base and a bracket for attaching the flame distribution plate and the frying base at a desired distance to form a uniformly movable grill converter for converting cooking function of the camping stove to grilling function by distributing the point-like flame through the flame distribution plate to the frying base for grilling food, and the flame distribution plate having dimensions of +/−40 mm with respect to the first diameter of the bottom of the first pot, wherein the frying base comprises bends at an angle of 75° to 105° at the edges, the bends being 3 to 60 mm in length.

2. The grill converter according to claim 1, wherein the flame distributor plate has a thickness of 0.3 to 2 mm, in which holes are formed outside a flame target zone to direct the point-like flame into area of the flame distributor plate.

3. The grill converter according to claim 1, wherein the frying base is grate-shaped.

4. The grill converter according to claim 1, wherein the frying base comprises diameter dimensions such that, when installed in the operating position, the frying base rests on hinge points of the pan brackets in an inner body of a camping stove structure.

5. A grill converter of a camping stove for outdoors conditions, the camping stove comprising at least two pots, the at least two pots including a first pot with a bottom having a first diameter and a second pot with a bottom having a second diameter, the second diameter being larger than the first diameter, wherein the grill converter comprises a flame distribution plate to receive and spread a point-like flame, a frying base placed over the flame distribution plate for grilling food on the frying base and a bracket for attaching the flame distribution plate and the frying base at a desired distance to form a uniformly movable grill converter for converting cooking function of the camping stove to grilling function by distributing the point-like flame through the flame distribution plate to the frying base for grilling food, and the flame distribution plate having dimensions of +/−40 mm with respect to the first diameter of the bottom of the first pot, wherein the bracket is an iron wire-like part bent from a metal material with a diameter of 1 to 7 mm and a longest continuous side of 50 to 190 mm.

6. A grill converting method of a camping stove for outdoors conditions, wherein the camping stove is converted from a cooking function to a grilling function by placing a frying base over a flame distribution plate, wherein the frying base is attached to the flame distribution plate at a desired distance by using a bracket to form a uniformly movable grill converter as a structure for grilling, wherein a point-like flame is distributed through the flame distribution plate to the frying base for grilling food on the frying base, and wherein the flame distribution plate is dimensioned with a diameter of +/−40 mm with respect to a diameter of a smallest pan bottom of the camping stove structure, wherein the frying base is bent upwards at an angle of 75° to 105° and said bendings have a length of 3 to 60 mm.

7. The grill converting method according to claim 6, wherein the flame distributor plate has a thickness of 0.3 to 2 mm, in which holes are formed outside a flame target zone to direct the point-like flame into area of the flame distributor plate.

8. The grill converting method according to claim 6, wherein the frying base is grate-shaped.

9. The grill converting method according to claim 6, wherein when installed in the operating position, the frying base rests on hinge points of the pan brackets in an inner body of a camping stove structure.

10. A grill converting method of a camping stove for outdoors conditions using a first pan with a bottom having a first diameter, wherein the camping stove is converted from a cooking function to a grilling function by placing a frying base over a flame distribution plate, wherein the frying base is attached to the flame distribution plate at a desired distance by using a bracket to form a uniformly movable grill converter as a structure for grilling, wherein a point-like flame is distributed through the flame distribution plate to the frying base for grilling food on the frying base, and wherein the flame distribution plate is dimensioned with a diameter of +/−40 mm with respect to the first diameter of the bottom of the first pan, wherein the bracket has been bent from a metal material with a diameter of 1 to 7 mm and a longest continuous side of the bracket is 50 to 190 mm.

* * * * *